May 10, 1966

T. H. ROGERS 3,250,916

STEREO X-RAY DEVICE

Filed June 14, 1963

*INVENTOR.*
THOMAS H. ROGERS
BY
*H. Murphy*
AGENT

May 10, 1966 T. H. ROGERS 3,250,916
STEREO X-RAY DEVICE
Filed June 14, 1963 3 Sheets-Sheet 2

INVENTOR.
THOMAS H. ROGERS
BY
AGENT

May 10, 1966 T. H. ROGERS 3,250,916
STEREO X-RAY DEVICE

Filed June 14, 1963 3 Sheets-Sheet 3

INVENTOR.
THOMAS H. ROGERS
BY
AGENT

United States Patent Office 3,250,916
Patented May 10, 1966

3,250,916
STEREO X-RAY DEVICE
Thomas H. Rogers, New Canaan, Conn., assignor to Machlett Laboratories, Incorporated, Springdale, Conn., a corporation of Connecticut
Filed June 14, 1963, Ser. No. 287,993
9 Claims. (Cl. 250—60)

This invention relates to X-ray systems for producing X-ray images for stereo fluoroscopy and/or stereo cinefluorography, and X-ray generating devices for use in such systems.

It has long been common practice to produce stereo X-ray photographs of stationary objects by making two X-ray pictures on film with a procedure whereby the X-ray generating tube is shifted, after making the first exposure, by a distance approximately equal to the average interpupillary distance of individuals viewing same, whereupon the second exposure is made. The two pictures so obtained are viewed through a stereoscopic viewing device which presents one of the images to one eye of the viewer and simultaneously presents the other image to the other eye. Such stereo viewing devices are, of course, well known and require no explanation.

For continuous stereo fluoroscopy of objects in motion, the problem is not so simple, since it is necessary to provide an essentially continuously presented pair of mutually displaced images with stereo separation for the respective eyes of the viewing individual. A number of systems for accomplishing such stereo fluoroscopy have been devised wherein the required mutually displaced images are produced by X-ray beams from two separate X-ray tubes positioned so that their respective X-ray producing focal spots approximate as nearly as possible the average interpupillary distance. In such systems these two X-ray tubes are energized either by two separate X-ray machines or by a single X-ray machine provided with a switching system so as to switch high voltage alternately from one tube to another in an appropriate rapid succession.

Various systems have been used to present the resultant images to the viewing individual in a manner suitable for stereoscopic vision. These are generally well known in the literature, and for the purpose of illustrating the present invention, reference may be made to an article entitled, "Stereoscopic Televised Fluoroscopy," appearing in Radiology, volume 79, No. 1, pp. 30–34, July 1962. This system uses two X-ray tubes, as described above, with the respective anodes of the two tubes being energized by alternate half cycles of 60-cycle alternating voltage output of a conventional high tension X-ray transformer. Such a system has several disadvantages, some of which may be enumerated as follows: The use of two separate X-ray tubes requires the focal spots to be separated by a distance generally considerably greater than the desired approximation of an average interpupillary distance. The use of two separate X-ray tubes presents a bulky and cumbersome physical arrangement. The use of alternate half cycles of 60-cycle power limits the frequency of presentation and also the time interval between alternate images of a stereo pair to the characteristics of the power supply system.

In the present invention, the X-ray source for stereo fluoroscopy is provided in a single tube unit, with a high degree of flexibility in the rate at which stereo images may be produced and in the time spacing between the two images of a stereo pair. In this tube, a single anode is employed in conjunction with two electron beam sources spaced appropriately far apart to permit the formation of two focal spots with a suitable relative spacing to approximate the desired average interpupillary distance.

In a preferred embodiment of this invention, the anode comprises a rotating target disc, which may be approximately 4 inches in diameter. This tube is provided with two electrically separate cathodes of the grid-controlled type, each cathode being preferably as set forth in copending application entitled "Improvements in Radiographic Systems and Method," Serial No. 19,101, filed March 31, 1960, now Patent No. 3,103,591, and assigned to the same assignee as the instant invention. This tube may be mounted in a shockproof enclosure of conventional size, which is provided with two separate high-tension bushings for the introduction of cathode and grid potentials to the respective cathodes through separate shockproof cables or, alternatively, a single shockproof cable wherein the central core comprises leads for excitation of the filaments, and adequately insulated auxiliary leads for the introduction of the required grid potentials to the respective grids independently.

In the operation of this tube, rotation of the anode is achieved in a conventional manner, and positive potential is applied to the anode continuously. The two cathodes are heated simultaneously to the point of suitable electron emission and are biased to cut-off by a negative grid potential applied to the respective grids through corresponding leads from a grid biasing voltage supply. The respective focal spots are energized in the desired alternating time sequence by any suitable method of removing the biasing potential between the grid and filament such as, for example, by applying a positive pulse to the grid of sufficient magnitude to cancel the biasing potential. The timing and duration of these pulses can be controlled precisely and quite independently of the power line voltage phase and frequency. For instance, in the case of a rapdily moving object, it is necessary that the two pulses producing the two images of a stereoscopic pair be spaced in time by an interval sufficiently short that the position of the moving object to be viewed is not changed appreciably during the interval between the two pulses. Otherwise, the apparent position of the object, when viewed stereoscopically, will be inaccurate.

The viewing system to be employed with the stereo-image producing source is based on the use of time separation between the two images of the stereoscopic pair, permitting the respective images to be alternately displayed in a manner which will permit the respective eyes of the viewing individual to see only the particular images intended for them, thus permitting one eye to see an image while preventing the opposite eye from seeing the same image. The system referred to in the reference mentioned above is only one of several possible systems that have been devised and described in the literature for such time separation in the viewing of such images. However, the basic principle of controlling the time incidence and sequency of the respective X-ray sources by means of the grid control principle, with both grid-controlled cathodes within the same envelope permitting appropriate focal spot spacings, is applicable to any and all such systems for separating the resulting images for stereoscopic viewing.

Another embodiment of the present invention utilizes a single grid-controlled cathode in an electron gun arrangement incorporating a deflection system for deflecting the cathode beam to the respective focal spots with required timing and sequence. In general, however, it is believed simpler to provide two separate cathodes so as to obviate the necessity for the added and relatively complex deflection system. However, the scope of this invention includes either embodiment and other modifications and variations thereof which would become apparent to one skilled in the art.

The advantages of this invention will become apparent from the following description taken in connection with the accompanying drawings, wherein.

Figure 1:
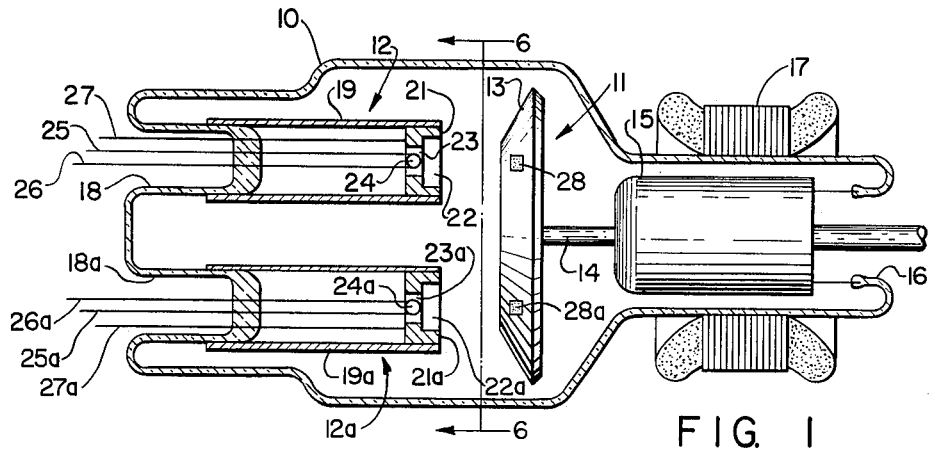
FIG. 1 is an axial sectional view of an X-ray tube embodying a preferred form of the invention.

Referring to the X-ray tube illustrated in FIG. 1, the tube comprises a glass envelope 10 having an anode structure 11 in one end thereof and a pair of cathode structures 12 and 12a in the other end. Anode structure 11 comprises a tungsten target 13 which is located on one end of a rotatable shaft 14 which is in turn carried by a supporting rotor structure 15 sealed to a re-entrant portion 16 of the envelope 10. Upon operation of suitable inductive means 17 (FIG. 1) external of the envelope, the anode 13 acts upon the rotor structure 15 to cause the anode 11 to rotate at high speed about the axis of shaft 14.

Figure 2:
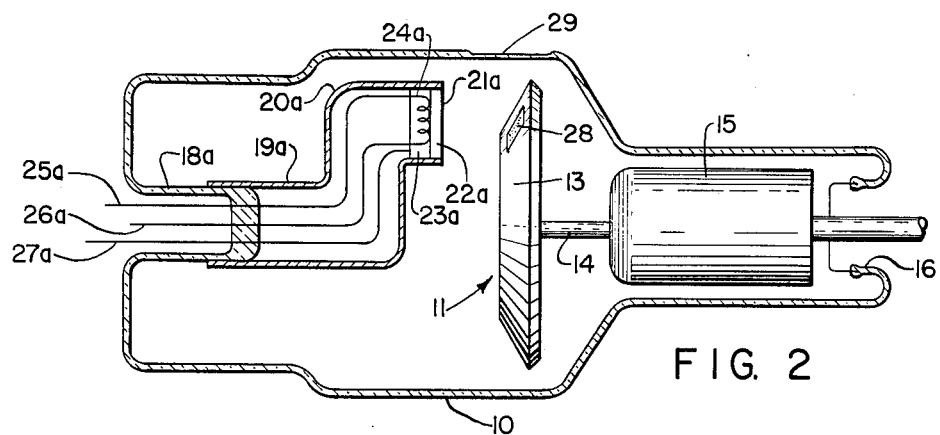
FIG. 2 is an axial sectional view of the X-ray tube shown in FIG. 1 taken along a plane substantially 90° from the section of FIG. 1.

The opposite end of the envelope 10 is provided with two re-entrant necks 18 and 18a, each of which supports a respective cathode structure 12–12a. Each cathode structure includes a respective support sleeve 19–19a which is suitably sealed to the respective neck. As shown in FIG. 2, each sleeve has an offset portion 20–20a which carries at its outer end a cathode head 21–21a.

Each cathode head comprises a metal block having a pair of communicating aligned cavities 22–22a and 23–23a (FIG. 1), respectively, therein. Located adjacent the mouth of the smaller 23–23a of the two cavities or slots is a respective filament 24–24a which extends longitudinally thereof for a selected relatively short distance substantially parallel with the plane of the bottom of the slot. The leads 25–25a and 26–26a extend through the stems which form the innermost parts of the re-entrant necks 18–18a and are adapted to be connected by suitable means to a filament power supply.

Other leads which also extend outwardly of the tube through the respective stems are connected directly to each cathode block 21–21a whereby the block may perform as switching means for the purpose of controlling the flow of electrons from the filaments 24–24a. In operation of the tube, a selected voltage is applied between the filaments and the anode and a negative bias is applied to the blocks through leads 27–27a to prevent flow of electrons from the filaments to the anode. Then upon production of a series of pulses by a suitable pulse-forming circuit, the pulses will be transmitted alternately to the blocks 21 and 21a. Each pulse will remove the negative bias upon the respective block to which it is applied, whereupon the block will assume substantially the potential of the filament therein. After the pulse has been transmitted to a block to create flow of electrons from its associated filament, the negative potential will be automatically restored thereon. In this way electrons will be permitted to flow alternately from the filaments 24–24a to the target 13, causing the generation of X-ray beams from focal spots 28 and 28a thereon which beams are emitted outwardly of the tube through a window 29 (FIG. 2) in the envelope 10.

Figure 6:
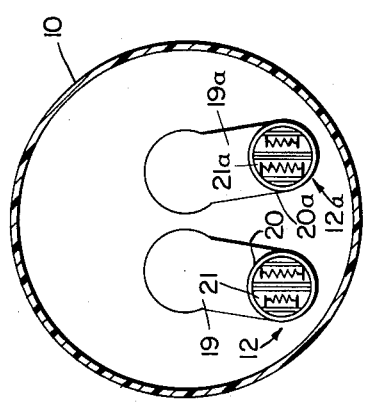
FIG. 6 is a sectional view of the X-ray tube taken substantially on line 6—6 of FIG. 1 looking in the direction of the arrows.

It is to be understood that although each cathode structure 12–12a has been shown and described as embodying a single filament, it is conceiveable that each cathode structure may embody two separate filaments if desired as shown in FIG. 6. For more details of the actual construction of a dual filament cathode and its operation, reference is made here to the abovementioned co-pending application Serial No. 19,101. Such dual filament cathodes provide means for selectively obtaining a relatively small and uniform focal spot such as is desirable for cineradiography and a larger focal spot such as is usable in conventional spot film radiography.

It is also to be understood that the control electrode exemplified by the blocks 21–21a may take other forms than that herein described as, for example, a parallel wire grid or mesh grid interposed between the cathode and anode as in conventional triode structures. The advantages of the presently described control electrode resides in combining the focus and control functions, as described in the above referred-to co-pending application. However, this structure per se does not form the basic principle of the present invention which primarily relates to controlling the time incidence and sequence of respective X-ray sources within a common envelope by means of the grid control principle.

Figure 4:
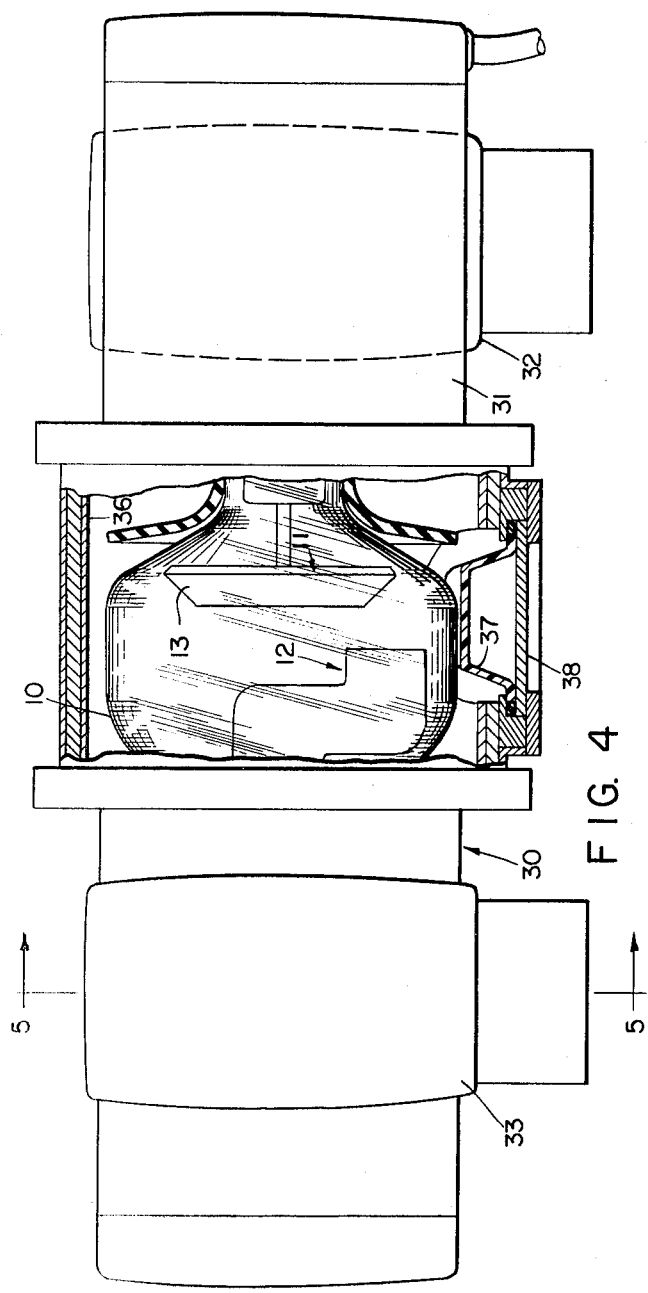
FIG. 4 is a side elevational view of an X-ray generator housing with a portion of the side wall removed to show an X-ray tube embodying the invention therein.
Figure 5:
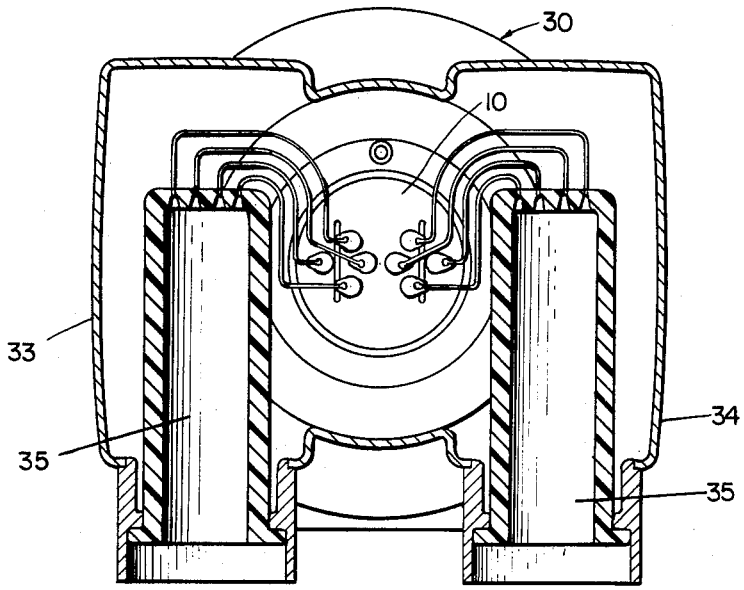
FIG. 5 is a sectional view taken substantially on line 5—5 of FIG. 4 looking in the direction of the arrows.

As shown in FIGS. 4 and 5, the X-ray tube 10 is adapted to be mounted in a housing 30 which comprises a hollow cylindrical body 31 from one side of which extend horns 32, 33 and 34. Horn 32 provides means whereby lead wires (not shown) are brought into the housing to supply suitable electric potential to the anode 11 of the X-ray tube, while horns 33 and 34 simultaneously provide means whereby power is supplied by suitable leads (FIG. 5) to the respective cathodes 12 and 12a in the X-ray tube. The horns function as connectors having receptacles 35 into which high voltage cables may be inserted in any suitable manner to supply the necessary power to the X-ray tube from associated power supplies.

The housing 30 contains a suitable lead or other X-ray absorbent lining 36 (FIG. 4) which functions to prevent X-radiation from the target 13 to escape except through a port or window 37 in the housing and, if desired, through an aluminum or other filter 38 which covers the port. Thus all the useful radiation emanating from both focal spots 28 and 28a passes outwardly through the same exit means into the same zone to be irradiated, as shown diagrammatically in FIG. 8.

In accordance with this invention, the cathodes 12–12a are alternately operated to produce two separate streams or beams of electrons directed toward the target 13. The cathodes and focal spots, or points of impact of the electron beams upon the target, are spaced apart a predetermined distance which is representative of the interpupillary distance of a viewer. Thus, impact of the two electron beams upon two separate spaced areas of the target generates two separate beams of X-radiation which emanate from the focal spots.

A subject 39 (FIG. 8) to be examined is positioned opposite the port 37 so that both cones 40 and 40a of escaping X-radiation pass through the subject from the two spaced focal spots.

Figure 7:
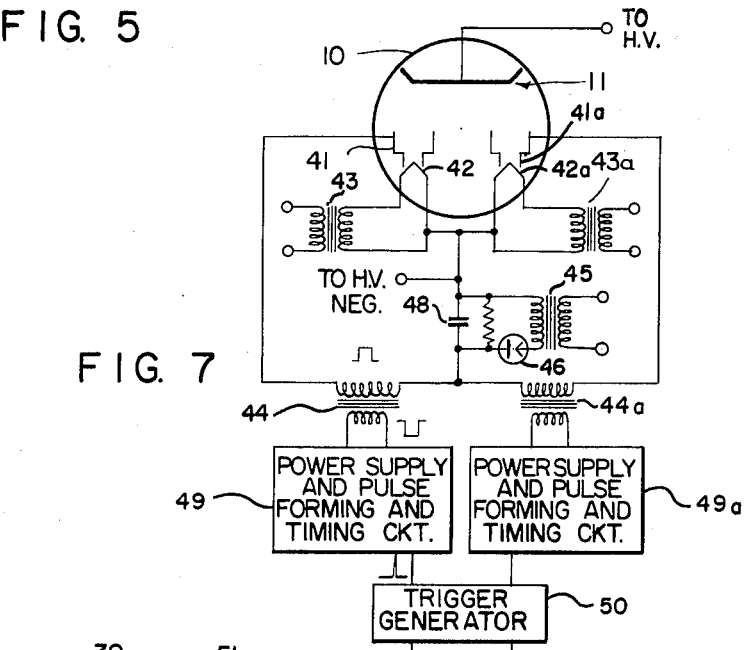
FIG. 7 is a schematic diagram of a circuit usable for pulsing the cathodes of the invention.

Referring to the simplified circuit shown in FIG. 7, there are shown two cathodes having respective filaments 42 and 42a fed by respective transformers 43 and 43a. The filaments are normally maintained at the point of emission, but emission is suppressed by maintaining the cathode blocks, shown diagramatically at 41 and 41a, at a negative potential of, for example, 1500 volts with respect to the potential of the filaments. Such negative biasing is achieved through the secondaries of pulse transformers 44 and 44a by means of a power supply including a transformer 45, rectifier 46, resistor 47, and a filter capacitor 48. Means not shown in the circuit of FIG. 7 is also provided for supplying power for energizing the X-ray tube and is connected across the filaments and the anode of the tube in a known manner. Any desired means may be utilized for pulsing the filaments alternately, as required in the presently described device, and one such means employs a pulse forming and timing circuit 49 and 49a connected to each respective transformer 44–44a to which trigger pulses are alternately supplied from a trigger generator 50 such as a bi-stable multivibrator. The circuits 49 and 49a each may embody a square wave power amplifier as well as a pulse forming and timing circuit such as a monostable multivibrator whereby a trigger pulse will cause generation of a square pulse of controlled length, which square pulses are applied alternately to the cathode blocks to overcome the negative bias on the blocks which will permit electrons to flow alternately from the filaments. Since the pulses are thus effectively applied alternately to the filaments, the filaments will correspondingly alternately emit electrons to form X-ray beams emanating alternately from the two spaced focal spots. Thus, the X-ray beams will alternately pass through the subject 39 to form two separate stereo images of the subject.

One particularly suitable means for forming square pulses is clearly shown and described in U.S. Patent No. 2,879,404. Such a system may be easily modified to provide pulses alternately to two separate cathodes, as required in the present invention. It is to be understood, however, that any other circuit may be used for this purpose.

Figure 8:
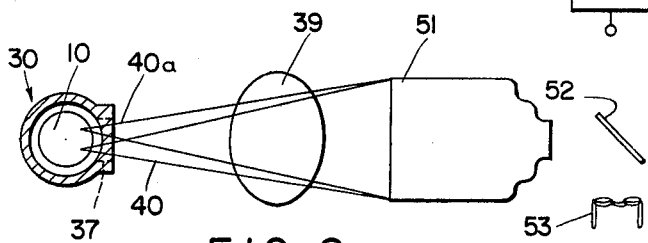
FIG. 8 is a diagram of the invention applied to one form of imaging and viewing system.

In the system, as depicted diagrammatically in FIG. 8, the two time-spaced X-ray beam 40–40a after passing through the subject 39 will fall upon an X-ray sensitive image intensifier 51. Although the X-ray images of the subject impinge upon the same input screen of the image intensifier, they will not be simultaneously applied to the screen but instead will be alternately applied due to the fact that the X-ray beams are generated alternately by alternate operation of the cathode as described. The intensifier 51 will in its normal operation produce resultant alternately presented visible images on its output screen, which images will be alternately viewed by the right and left eyes of a viewer through suitable stereoscopic viewing means not forming a part of this invention. Such means may include a low power stereomicroscope, a binocular viewer, or other device having a shutter which is operated synchronously with the operation of the cathodes. Thus the shutter allows the image on the amplifier to be viewed with the right eye when the "right eye" is activated and the left eye when the corresponding cathode is activated. In FIG. 8, a mirror 52 is employed to direct the visible light images from the intensifier 51 to the viewing system, depicted as spectacles 53, so that the viewer will be out of the direct field of X-radiation.

Figure 3:
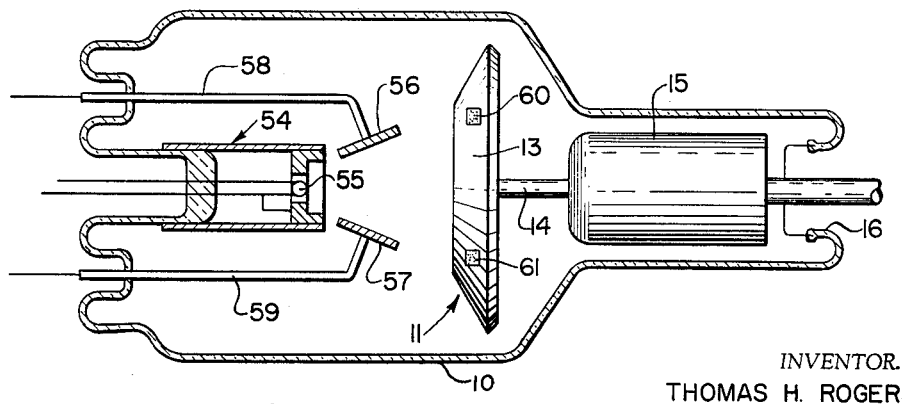
FIG. 3 is an axial sectional view of an X-ray tube embodying a modified form of the invention.

It is to be understood also that the X-ray tube may take other forms for the production of two alternately timed X-ray beams from two physically spaced focal points. Such a modification is shown in FIG. 3 wherein a single cathode structure 54 is shown for the production of a single beam of electrons from a single filament 55. In this device there is provided a deflection system comprising a pair of deflecting plates 56–57 on opposite sides of the cathode which are connected by conductive supports 58–59 respectively to leads external to the tube for supplying suitable potentials to the plates whereby a continuous or intermittent beam of electrons from the filament 55 may be switched alternately between two focal spots 60 and 61 spaced appropriately apart on the target 13.

It will be apparent that various other modifications of this invention may be made by those skilled in the art without departing from the spirit of the invention as expressed in the accompanying claims.

What is claimed is:

1. In a stereoscopic X-ray system, an X-ray generating device comprising a vacuumized envelope having therein a rotatable target and means for generating electrons, means for directing electrons from said first means alternately onto two spaced focal spots spaced apart at an interpupillary distance on the target and for creating emission of X-rays from said spots, and means for alternately transmitting X-rays form the focal spots to a single zone to be irradiated.

2. An X-ray generating device as set forth in claim 1 wherein said means for generating electrons comprises two separate cathodes spaced apart at an interpupillary distance.

3. An X-ray generating device as set forth in claim 1 wherein said means for generating electrons comprises a single filamentary cathode, and said means for directing electrons comprises electrostatic deflection means.

4. In a stereoscopic X-ray system, an X-ray generating device comprising an evacuated envelope, a rotatable anode and two cathodes within the envelope, means for maintaining both cathodes at the point of electron emission, and electrical control means for creating emission of electrons alternately from said cathodes and for directing said electrons to two separate respective focal spots on the anode, said focal spots being spaced apart at an interpupillary distance whereby two separated beams of X-radiation are generated from said spots, said electrical control means comprising means for applying a negative bias to said cathodes for suppressing electron emission and means for alternately pulsing the cathodes to overcome the negative bias and permit electron flow therefrom.

5. A stereoscopic X-ray generating device comprising an evacuated envelope, a rotating anode and a pair of spaced cathodes within the envelope each cathode embodying grid means, means for maintaining both cathodes at the point of electron emission, bias means connected to said grids for suppressing emission of electrons from the cathodes, and means connected to the grids for overcoming said negative bias thereon alternately to permit the cathodes to alternately emit electrons, said electrons from the respective cathodes impinging upon two separate respective focal points on the anode, said focal spots being spaced apart at an interpupillary distance whereby two separate beams of X-radiation are generated from said spots.

6. In a stereoscopic X-ray system, the combination of a stereoscopic X-ray generating device comprising an evacuated envelope, a rotating anode, and two cathodes within the envelope, means for causing the cathodes to produce electrons and to direct said electrons to two respective focal points on the anode, said focal spots being spaced apart at an interpupillary distance whereby two separate beams of X-radiation are generated from said spots, means for directing said beams of X-radiation through a subject onto an image intensifier, and stereo viewing means for viewing the resultant visible images produced by the intensifier.

7. In a stereoscopic X-ray system, the combination of a stereoscopic X-ray generating device comprising an evacuated envelope, a rotating anode and two cathodes within the envelope, means for maintaining both cathodes at the point of electron emission, means for creating emission of electrons alternately from said cathodes and directing said electrons to two separate focal points on the anode, said focal spots being spaced apart at an interpupillary distance whereby two separate beams of X-radiation are generated from said spots, means for directing said beams of X-radiation through a subject onto an image intensifier, and stereo viewing means for viewing the resultant visible images produced by the intensifier.

8. In a stereoscopic X-ray system, the combination of a stereoscopic X-ray generating device comprising an evacuated envelope, a rotating anode and a pair of spaced cathodes within the envelope, means for maintaining both cathodes at the point of electron emission, means for applying a negative bias to said cathodes for suppressing electron emission, and means for alternately pulsing the cathodes to overcome the negative bias and permit electron flow therefrom onto two separate respective focal spots on the anode, said focal spots spaced apart at an interpupillary distance whereby two separate beams of X-radiation are generated from said spots, means for directing said beams of X-radiation through a subject onto an image intensifier, and stereo viewing means for viewing the resultant visible images produced by the intensifier.

9. In a stereoscopic X-ray system, the combination of a stereoscopic X-ray generating device comprising an evacuated envelope, a rotating anode and a pair of spaced cathodes within the envelope each cathode embodying grid means, means for maintaining both cathodes at the point of electron emission, bias means connected to said grids for suppressing emission of electrons from the cathodes, means connected to the grids for overcoming said negative bias thereon alternately to permit the cathodes to alternately emit electrons onto two separate respective focal spots on the anode, said focal spots being spaced apart at an interpupillary distance whereby two separate beam of X-radiation are generated from said spots, and means for directing said beams of X-radiation through a subject onto an image intensifier, and stereo viewing means for viewing the resultant visible images produced by the intensifier.

References Cited by the Examiner
UNITED STATES PATENTS

| | | | |
|---|---|---|---|
| 688,458 | 12/1901 | Caldwell | 250—60 |
| 2,862,107 | 11/1958 | Cummings | 250—99 |
| 2,946,892 | 7/1960 | Bas-Taymaz | 250—99 |
| 2,948,822 | 8/1960 | Paroselli | 250—94 |
| 3,076,054 | 1/1963 | Simon | 250—60 |

OTHER REFERENCES

A.P.C. application of Schwarzer, Serial No. 358,686, published May 25, 1943. The Schwarzer application has become abandoned.

RALPH G. NILSON, *Primary Examiner.*

H. S. MILLER, A. L. BIRCH, *Assistant Examiners.*